US012807233B2

(12) United States Patent
Otani et al.

(10) Patent No.: US 12,807,233 B2
(45) Date of Patent: Nov. 24, 2026

(54) VEHICLE IMPACT ABSORBING STRUCTURE

(71) Applicant: Mazda Motor Corporation, Hiroshima (JP)

(72) Inventors: Takahiro Otani, Hiroshima (JP); Masaaki Tanaka, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 210 days.

(21) Appl. No.: 18/903,028

(22) Filed: Oct. 1, 2024

(65) Prior Publication Data

US 2025/0115299 A1 Apr. 10, 2025

(30) Foreign Application Priority Data

Oct. 6, 2023 (JP) ................................ 2023-174609

(51) Int. Cl.
*B62D 21/15* (2006.01)

(52) U.S. Cl.
CPC ................................ *B62D 21/152* (2013.01)

(58) Field of Classification Search
CPC ........ B62D 21/15; B62D 21/02; B60R 19/24; B60R 19/34
USPC .................................................... 296/187.09
See application file for complete search history.

(56) References Cited

U.S. PATENT DOCUMENTS 5,803,514 A * 9/1998 Shibuya .................. B60R 19/24 293/133
6,957,846 B2 * 10/2005 Saeki ................... B62D 21/152 296/187.1
8,764,096 B2 * 7/2014 Han ........................ B60R 19/34 296/133
9,266,484 B2 * 2/2016 Nakanishi ............... B60R 19/34
9,266,485 B2 2/2016 Kuriyama et al.
2014/0203578 A1 * 7/2014 Kaneko ................... B60R 19/34 293/133
2014/0361561 A1 * 12/2014 Kuriyama ............... B60R 19/34 293/133
2015/0329144 A1 * 11/2015 Hara .................... B62D 25/082 296/187.09
2023/0271583 A1 * 8/2023 Soevik .................... B60R 19/34 293/133

FOREIGN PATENT DOCUMENTS

JP 2018-118565 A 8/2018

OTHER PUBLICATIONS

Extended European Search Report issued Feb. 26, 2025 in European Patent Application No. 24201289.6.

* cited by examiner

*Primary Examiner* — Amy R Weisberg
*Assistant Examiner* — Daniel R Digiovannantonio
(74) *Attorney, Agent, or Firm* — XSENSUS LLP

(57) ABSTRACT

A vehicle impact absorbing structure includes a side frame, a bumper beam, and an impact absorbing member that is compressively deformable by an impact load input to the bumper beam from the front of a vehicle. The impact absorbing member has: a first portion; and a second portion that extends from a front end of the side frame toward the front of the vehicle while being inclined outward in a vehicle width direction, and is joined to a beam end portion of the bumper beam. A Bending rigidity of the second portion against a load in the vehicle width direction, is higher than a bending rigidity of the first portion against the load in the vehicle width direction.

13 Claims, 13 Drawing Sheets

VEHICLE IMPACT ABSORBING STRUCTURE

CROSS-REFERENCE TO RELATED APPLICATION

The present application claims priority to Japanese Patent Application 2023-174609, filed Oct. 6, 2023, the entire contents of which are incorporated herein by reference.

FIELD

A technique disclosed herein relates to a vehicle impact absorbing structure.

DESCRIPTION OF THE RELATED ART

A conventional vehicle body front structure is described in Patent Literature 1. The conventional vehicle body front structure transmits an impact load to a vehicle body frame member during a small overlap collision. The small overlap collision refers to the following collision; of offset collisions in which a vehicle body and a colliding object collide with each other while being offset from each other in a vehicle width direction, a collision with a narrow collision range in a side end portion in the vehicle width direction.

More specifically, the conventional vehicle body front structure includes an extension side member 14 and an extension crossmember 16. The extension side member 14 is located between a front end surface of a side member 12 and a crossmember 15, and is buckled and deformed during a collision to absorb the impact load. At a position on a rear surface of the crossmember 15 and on an outer side of the extension side member 14 in the vehicle width direction, the extension crossmember 16 protrudes from a rear surface of the crossmember 15 toward a vehicle body rear side.

During the small overlap collision, a side end portion in the vehicle width direction of the crossmember 15 is deformed inward in the vehicle width direction with an intersection point 15*b* between the crossmember 15 and the extension side member 14 being a rotation center. Along with deformation of the crossmember 15, the extension crossmember 16 rotates inward in the vehicle width direction with the intersection point 15*b* being the rotation center. The extension crossmember 16 then comes into contact with a side surface of the extension side member 14.

CITATION LIST

Patent Literature

[Patent Literature 1] JP2018-118565A

SUMMARY

The extension crossmember 16 in the conventional vehicle body front structure only has a function to transmit the impact load to the side member 12 during the small overlap collision. The extension crossmember 16 itself has high rigidity that prevents deformation during the collision, and weight thereof is relatively heavy.

The extension crossmember 16 is arranged not to contact the side member 12 during the offset collision, which is not the small overlap collision. This is because the contact of the extension crossmember 16 having the high rigidity with the side member 12 may interfere with buckling deformation of the extension side member 14. The extension crossmember 16 does not exert any function during the offset collision and a full-frontal collision.

A disadvantage of the extension crossmember 16 is that, despite its poor functionality, the extension crossmember 16 significantly increases vehicle weight.

The extension side member 14 has a reinforcement plate 17. This is because the extension crossmember 16 abuts the side surface of the extension side member 14 during the small overlap collision. The reinforcement plate 17 suppresses crushing deformation of the extension side member 14 in the vehicle width direction. The extension crossmember 16 causes a weight increase of the extension side member 14.

A technique disclosed herein improves collision performance during a small overlap collision without increasing vehicle weight.

A technique disclosed herein relates to a vehicle impact absorbing structure. The vehicle impact absorbing structure includes:

- a side frame that extends in a vehicle front-rear direction in a vehicle front portion;
- a bumper beam that extends in a vehicle width direction in front of the side frame, the bumper beam having a beam end portion located on an outer side of the side frame in the vehicle width direction; and
- an impact absorbing member that couples a front end of the side frame and the bumper beam in the vehicle front-rear direction, the impact absorbing member being compressively deformed by an impact load that is input to the bumper beam from the front of the vehicle, in which
- the impact absorbing member has:
  - a first portion that extends from the front end of the side frame toward the front of the vehicle in the vehicle front-rear direction and is joined to the bumper beam; and
  - a second portion that extends from the front end of the side frame toward the front of the vehicle while being inclined outward in the vehicle width direction, and is joined to the beam end portion of the bumper beam, and
- bending rigidity of the second portion, which is bending rigidity against a load in the vehicle width direction, is higher than bending rigidity of the first portion, which is bending rigidity against the load in the vehicle width direction.

The vehicle impact absorbing structure includes the impact absorbing member. The impact absorbing member is located between the side frame and the bumper beam. The impact absorbing member is compressively deformed by the impact load that is input to the bumper beam from the front of the vehicle. The impact absorbing member exerts an energy absorption function through compressive deformation and transmits the impact load to the side frame.

The impact absorbing member has the first portion and the second portion. The first portion extends from the front end of the side frame toward the front of the vehicle in the vehicle front-rear direction. The first portion is compressively deformed by a colliding object during a full-frontal collision or an offset collision. Here, the full-frontal collision is a collision in which an entire front surface of the vehicle comes into contact with the colliding object. In addition, the offset collision described herein is an offset collision that is not a small overlap collision described below. The first portion absorbs energy and transmits the impact load to the side frame when being compressively deformed by the impact load in the vehicle front-rear direction.

In the vehicle front view, a rear end of the first portion overlaps the front end of the side frame. During the full-frontal collision or the offset collision, the impact load is efficiently input to the side frame via the first portion.

The second portion extends from the front end of the side frame toward the front of the vehicle while being inclined outward in the vehicle width direction, and is joined to the beam end portion of the bumper beam. During the small overlap collision, the colliding object collides with the beam end portion. The second portion, which connects the beam end portion and the front end of the side frame, transmits the impact load to the side frame while being compressively deformed by the impact load input to the beam end portion. The second portion has the energy absorption function.

Since the second portion is inclined with respect to the vehicle front-rear direction, the impact load that is input to the front end of the side frame through the second portion is broken down into a load in the vehicle front-rear direction and a load that is directed inward in the vehicle width direction. The load that is directed inward in the vehicle width direction is a reaction force that is directed inward in the vehicle width direction, and causes the vehicle to move inward in the vehicle width direction. Since the vehicle moves in a direction away from the colliding object, the colliding object is suppressed from coming into contact with a cabin behind the side frame.

During the small overlap collision, the impact absorbing member exerts the following functions by the second portion; (1) the energy absorption function, (2) a function to transmit the impact load to the side frame, and (3) a function to generate the reaction force directed inward in the vehicle width direction. The vehicle impact absorbing structure enhances collision performance during the small overlap collision. In addition, since the second portion itself has the energy absorption function, the energy absorption function of another component can be simplified for the energy absorption function of the second portion. The second portion having the energy absorption function is advantageous in reducing vehicle weight.

In addition, since the second portion is not a portion that comes into contact with another component such as the first portion, a reinforcement structure that assumes the contact with the second portion can be omitted. Therefore, the weight of the vehicle is reduced.

The second portion is inclined with respect to the vehicle front-rear direction. When the impact load is input to the beam end portion due to the small overlap collision, the inclined second portion is possibly bent outward in the vehicle width direction.

To handle this, the impact absorbing member is a member in which the bending rigidity of the second portion, which is the bending rigidity against the load in the vehicle width direction, is higher than the bending rigidity of the first portion, which is the bending rigidity against the load in the vehicle width direction. When the impact load of the small overlap collision is input to the beam end portion, the high bending rigidity prevents the second portion from being bent outward in the vehicle width direction. The second portion can efficiently transmit the impact load to the side frame while absorbing the energy through compressive deformation. During the small overlap collision, the impact absorbing member can stably exert the three functions described above.

A cross-sectional area of the second portion may be larger than a cross-sectional area of the first portion.

The large cross-sectional area is advantageous in improving the bending rigidity of the second portion. The cross-sectional area described herein is an area of a region in a cross section of the first portion, the region being surrounded by an outer peripheral edge thereof. Alternatively, the cross-sectional area is an area of a region in a cross section of the second portion, the region being surrounded by an outer peripheral edge thereof.

A width in the vehicle width direction of the second portion may be greater than a width in the vehicle width direction of the first portion.

The great width in the vehicle width direction enhances the bending rigidity in the vehicle width direction of the second portion. During the small overlap collision, the second portion is less likely to be bent outward in the vehicle width direction.

The first portion may be a closed cross-sectional structure that has a first closed cross section and a second closed cross section aligned in an up-down direction.

The first portion having the closed cross-sectional structure efficiently transmits the impact load to the side frame while being compressively deformed by the impact load. In addition, since the first portion has the two closed cross sections that are the first closed cross section and the second closed cross section, energy absorption efficiency thereof during the compressive deformation is high. Furthermore, due to the closed cross-sectional structure, the first portion can ensure the desired bending rigidity despite the small cross-sectional area.

The second portion may be a closed cross-sectional structure in which an upper plate section and a lower plate section are stacked and joined in the up-down direction, and at least one of the upper plate section and the lower plate section may have a joint flange.

The second portion having the closed cross-sectional structure is advantageous in improving the bending rigidity. In addition, since at least one of the upper plate section and the lower plate section of the second portion has the joint flange, the second portion has a ridgeline that is a corner formed by bending and extends from one end to the other end of the second portion. The bending rigidity of the second portion is further increased, and during the input of the impact load, the second portion stably realize both the absorption of the energy through the compressive deformation and the transmission of the impact load to the side frame.

Each of the first portion and the second portion may be the closed cross-sectional structure including the corner, the ridgeline of the corner of the second portion may continue from the bumper beam to the front end of the side frame, and a part of the rear end of the first portion may abut a side portion of the second portion.

The ridgeline of the corner of the second portion continues from the bumper beam to the front end of the side frame. During the small overlap collision, the second portion can further efficiently transmit the impact load, which is input to the beam end portion, to the front end of the side frame.

The part of the rear end of the first portion abuts the side portion of the second portion, and the remaining part of the rear end of the first portion is joined to the front end of the side frame. In other words, in a state of being in close proximity to each other in the vehicle width direction, the rear end of the first portion and the rear end of the second portion are joined to the front end of the side frame. Each of the first portion and the second portion can efficiently transmit the impact load to the front end of the side frame.

The impact absorbing member may have a common member that is provided across the first portion and the second portion and forms a part of each of the first portion and the second portion.

When the impact load of the small overlap collision is input to the beam end portion, the common member suppresses the second portion from collapsing outward in the vehicle width direction by the rigidity of the common member. Since bending and the collapse of the second portion is suppressed, the second portion can efficiently transmit the impact load to the side frame while absorbing the energy through the compressive deformation.

At least a part of the rear end of the second portion may be located on an outer side of the rear end of the first portion in the vehicle width direction.

During the small overlap collision, the second portion that is adjacent to the first portion can realize the energy absorption function and the function to transmit the impact load due to the high bending rigidity.

Advantages

The vehicle impact absorbing structure can help improve the collision performance during the small overlap collision without increasing the vehicle weight.

DETAILED DESCRIPTION

Embodiments of a vehicle impact absorbing structure are described below with reference to the drawings. The vehicle impact absorbing structure described herein is merely an example.

(Overall Structure of Vehicle Impact Absorbing Structure)

Figure 1:
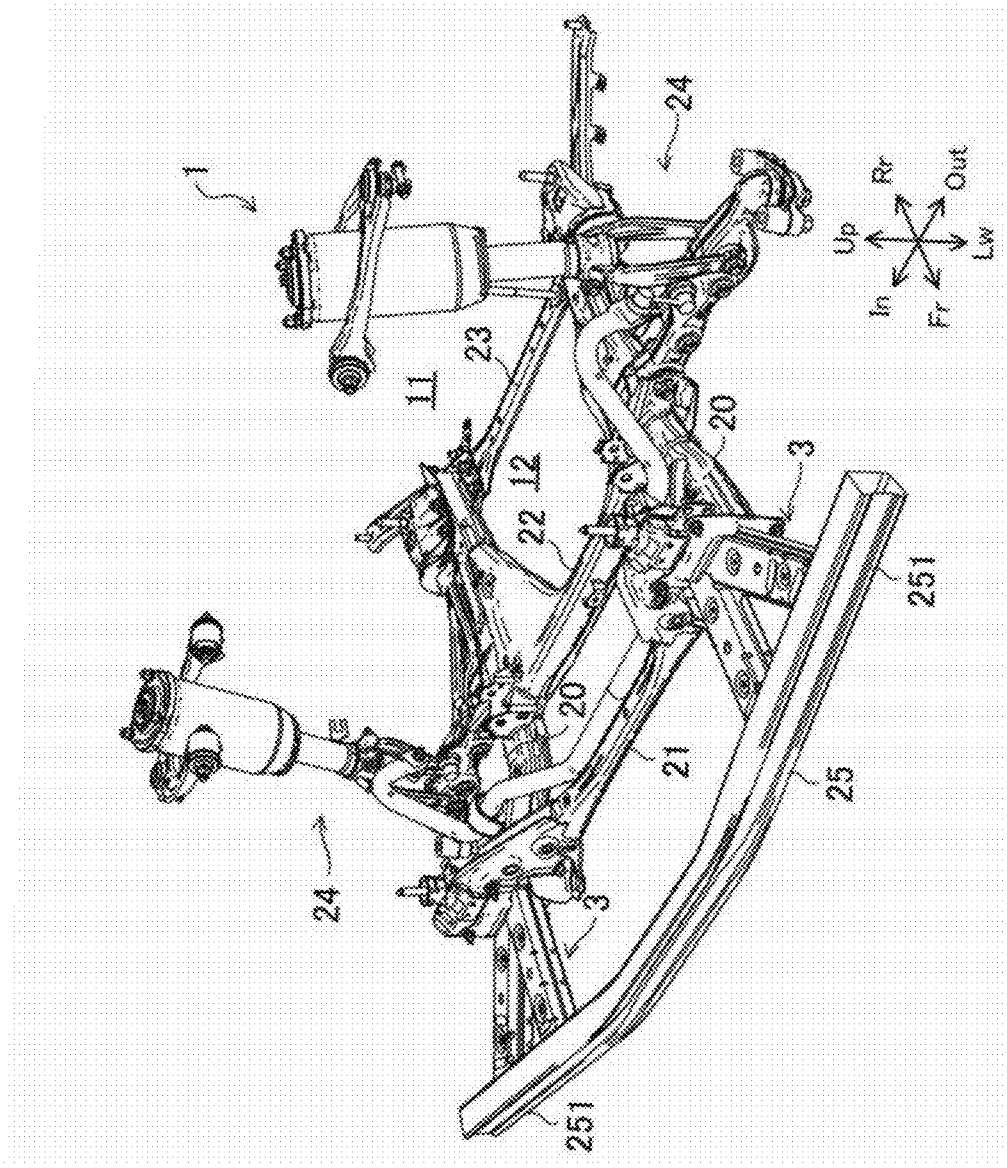
FIG. 1 illustrates a vehicle impact absorbing structure.
Figure 2:
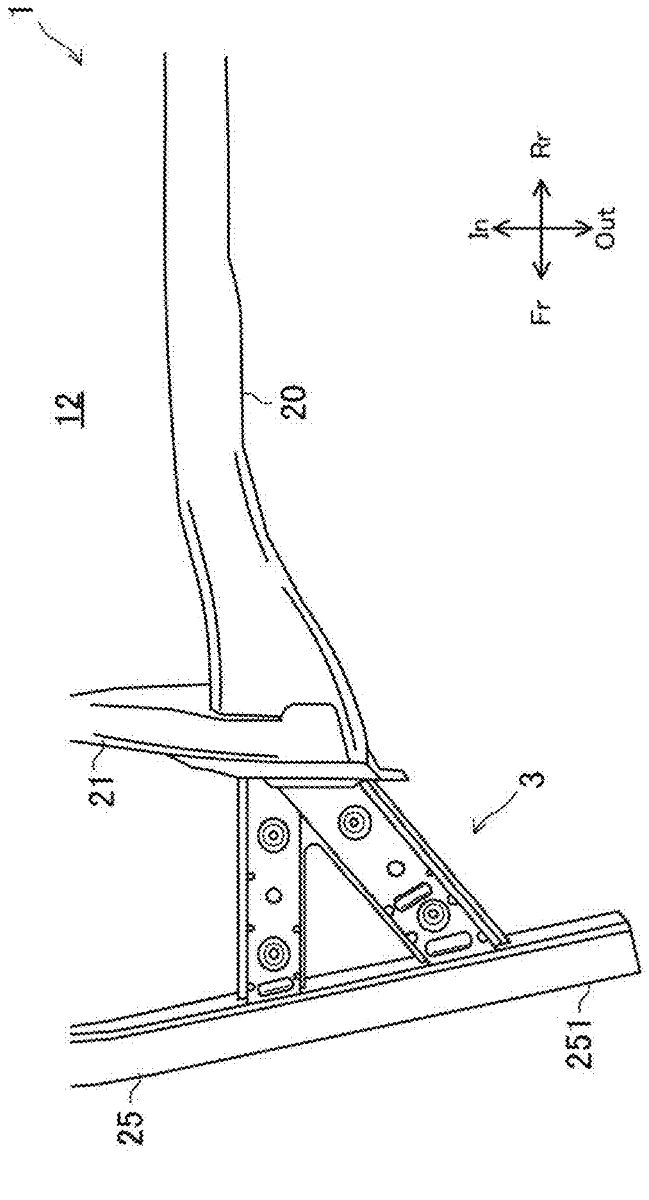
FIG. 2 illustrates a left portion in a vehicle front portion.

FIG. 1 illustrates a vehicle impact absorbing structure 1. FIG. 2 illustrates a left portion in a vehicle front portion.

The impact absorbing structure 1 is applied to the vehicle front portion. The impact absorbing structure 1 absorbs an impact during a full-frontal collision, an offset collision, or a small overlap collision of the vehicle.

The impact absorbing structure 1 includes two side frames 20. The side frames 20 are located below a front frame. The side frames 20 each extend in a vehicle front-rear direction from a dashboard for separating a cabin 11 and an engine compartment 12 toward the front of the vehicle. The engine compartment 12 houses an internal combustion engine and/or an electric motor.

The side frames 20 are aligned with a space therebetween in a vehicle width direction. The vehicle width direction is a direction orthogonal to the vehicle front-rear direction. A first crossmember 21, a second crossmember 22, and a third crossmember 23 are located between the two side frames 20. The first crossmember 21 extends in the vehicle width direction to connect front ends of the side frames 20. Behind the first crossmember 21, the second crossmember 22 connects the side frames 20 in the vehicle width direction. The second crossmember 22 is a suspension crossmember that supports right and left suspensions 24. The third crossmember 23 extends in the vehicle width direction to connect rear ends of the side frames 20.

The impact absorbing structure 1 includes a bumper beam 25. In front of the side frames 20, the bumper beam 25 extends in the vehicle width direction. The bumper beam 25 supports a lower portion of a vehicle front bumper. As illustrated in FIG. 2, the bumper beam 25 has a beam end portion 251 that is located at an outer side of the side frame 20 in the vehicle width direction. The beam end portion 251 is inclined rearward toward the outer side in the vehicle width direction.

The impact absorbing structure 1 includes impact absorbing members 3. The impact absorbing members 3 each couple the front end of the side frame 20 and the bumper beam 25 in the vehicle front-rear direction. The impact absorbing members 3 are compressively deformed or deformable by an impact load that is input to the bumper beam 25 from the front of the vehicle. The impact absorbing members 3 each have a function to absorb energy by compressive deformation and a function to transmit the impact load to the side frame 20.

(Structure of Impact Absorbing Member)

Figure 3:
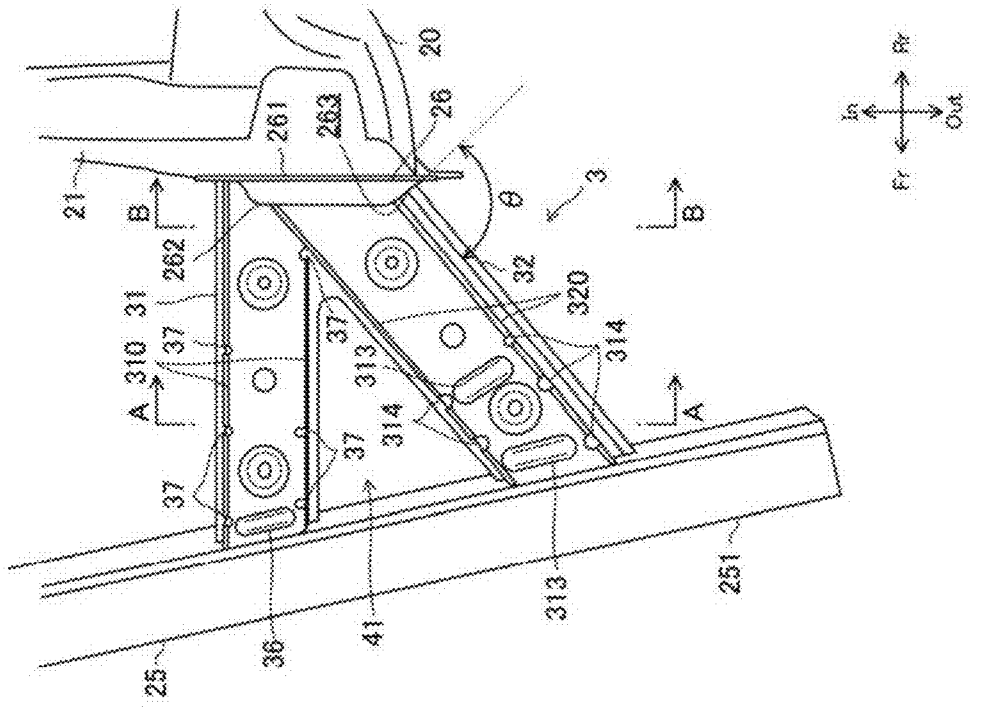
FIG. 3 is a plan view of an impact absorbing member.
Figure 4:
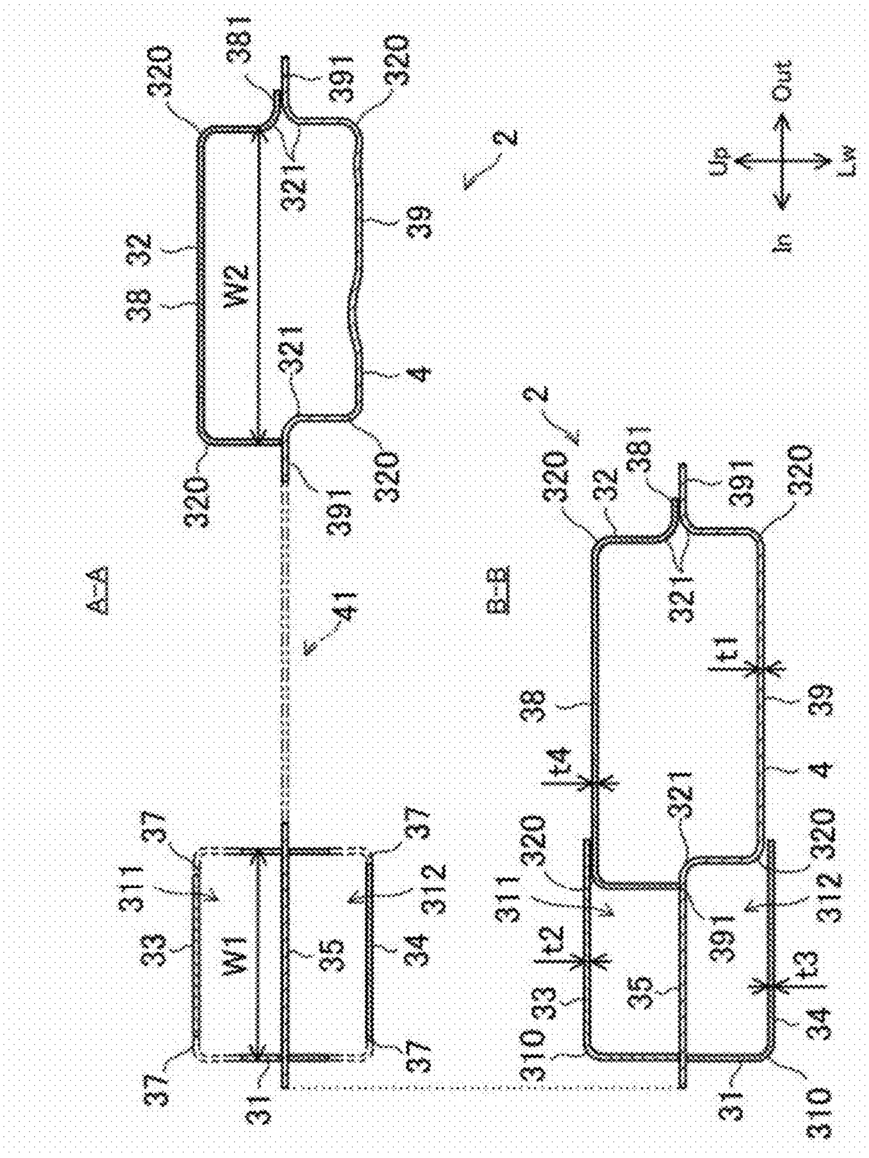
FIG. 4 includes a top view that is an end view taken along A-A in FIG. 3 and a bottom view that is an end view taken along B-B in FIG. 3.
Figure 5:
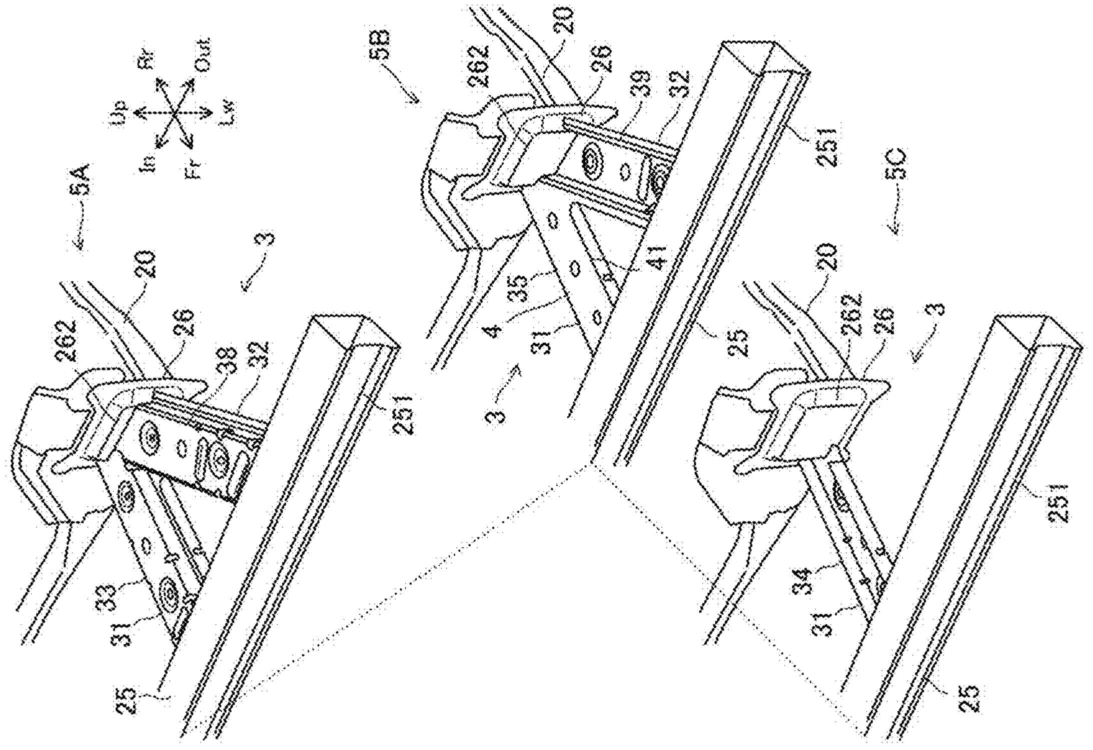
FIG. 5 includes perspective views of the impact absorbing member from which some members are sequentially removed.

FIG. 3 is a plan view in which the impact absorbing member 3 is enlarged. A top section of FIG. 4 is an end view that is taken along A-A in FIG. 3, and a bottom section of FIG. 4 is an end view that is taken along B-B in FIG. 3. FIG. 5 includes exploded views of the impact absorbing member 3.

The impact absorbing structure 1 includes a set plate 26. The set plate 26 is attached to the front end of the side frame 20. A rear end of the impact absorbing member 3 is joined to the set plate 26.

As illustrated in FIG. 3 and FIG. 5, the set plate 26 has a body section 261 and a convex section 262. The body section 261 is a flat plate that expands in up-down and right-left directions, and is fixed to the front end of the side frame 20. The convex section 262 is a portion that protrudes from the body section 261 toward the front of the vehicle. The convex section 262 has a rectangular shape in vehicle front view (also see FIG. 7). As illustrated in FIG. 3, the convex section 262 has an inclined surface 263 at an outer position in the vehicle width direction. As will be described below, the inclined surface 263 is a joint surface to which a part of the rear end of the impact absorbing member 3 is joined.

The impact absorbing member 3 has a first portion 31 and a second portion 32. As illustrated in FIG. 4, the first portion 31 and the second portion 32 are located at positions that are the same in the up-down direction and shifted from each other in the vehicle width direction.

The first portion 31 extends toward the front of the vehicle in the vehicle front-rear direction from the front end of the side frame 20, e.g., the set plate 26. An extending direction of the first portion 31 and an extending direction of the side frame 20 are the same or substantially the same. A front end of the first portion 31 is joined to a portion of the bumper beam 25 that is not the beam end portion 251, e.g., inward from the beam end portion 251.

The second portion 32 extends from the front end of the side frame 20 toward the front of the vehicle while being inclined outward in the vehicle width direction. The second portion 32 is joined to the beam end portion 251 of the bumper beam 25.

As illustrated in FIG. 4 and FIG. 5, the first portion 31 has an upper plate section 33, a lower plate section 34, and an intermediate plate section 35. A top section 5A of FIG. 5 illustrates a state where the upper plate section 33, the lower plate section 34, and the intermediate plate section 35 are stacked in the up-down direction to form the first portion 31. A middle section 5B of FIG. 5 illustrates a state where only the upper plate section 33 is removed and the intermediate plate section 35 is exposed. A bottom section 5C of FIG. 5 illustrates a state where the upper plate section 33 and the intermediate plate section 35 are removed and the lower plate section 34 is visible from above.

The upper plate section 33 has a transverse cross section in an inverted U-shape and is located on top of the intermediate plate section 35. Lower ends of the upper plate section 33 are joined to the intermediate plate section 35 by line welding. The lower plate section 34 has a transverse cross section in a U-shape and is located beneath the intermediate plate section 35 in the up-down direction. Upper ends of the lower plate section 34 are joined to the intermediate plate section 35 by line welding. A closed cross-sectional structure of the first portion 31 is formed by joining the upper plate section 33, the intermediate plate section 35, and the lower plate section 34 stacked in the up-down direction.

The first portion 31 has two closed cross sections, e.g., a first closed cross section 311 and a second closed cross section 312. The first closed cross section 311 and the second closed cross section 312 are stacked in the up-down direction. As illustrated in FIG. 3, ridgelines 310 of the first portion 31, which are defined by corners of the upper plate section 33 and corners of the lower plate section 34, extend in the vehicle front-rear direction.

The first portion 31 has a bead 36 and notches 37. Both the bead 36 and the notches 37 promote compressive deformation of the first portion 31. The bead 36 is formed in each of the upper plate section 33 and the lower plate section 34. The bead 36 is located in a tip portion of the upper plate section 33. A bead of the lower plate section 34 is also located at the same position as the bead 36 of the upper plate section 33, e.g., the bead of the lower plate section 34 is aligned with the bead of the upper plate section 33 in the up-down direction. The notches 37 are formed on the ridgelines 310 of each of the upper plate section 33 and the lower plate section 34. In the upper plate section 33 and the lower plate section 34, a plurality of the notches 37 is formed at spaced intervals in the vehicle front-rear direction.

As illustrated in FIG. 4 and FIG. 5, the second portion 32 has an upper plate section 38 and a lower plate section 39. The top section 5A of FIG. 5 illustrates a state where the upper plate section 38 and the lower plate section 39 are stacked in the up-down direction to form the second portion 32. The middle section 5B of FIG. 5 illustrates a state where the upper plate section 38 is removed and the lower plate section 39 is visible from above.

The upper plate section 38 has a transverse cross section in an inverted U-shape. A lower end of the upper plate section 38 on the outer side in the vehicle width direction is folded horizontally to form a joint flange 381. The lower plate section 39 has a transverse cross section in a U-shape. An upper end of the lower plate section 39 on the outer side in the vehicle width direction is folded horizontally to form a joint flange 391. The joint flange 391 is also formed on an inner side of the lower plate section 34 in the vehicle width direction. A closed cross-sectional structure of the second portion 32 is formed by joining the joint flange 381 of the upper plate section 38 to the joint flange 391 of the lower plate section 39, which are stacked in the up-down direction, and joining the lower end of the upper plate section 38 on the inner side in the vehicle width direction to the joint flange 391 of the lower plate section 39 by welding.

The second portion 32 has one closed cross section. As illustrated in FIG. 3, ridgelines 320 of the second portion 32, which are defined by corners of the upper plate section 38 and corners of the lower plate section 39, extend in a direction that is inclined with respect to the vehicle front-rear direction. The second portion 32 also has second ridgelines 321, each of which is defined by a corner formed by the joint flange 381 and the joint flange 391, on the inside of the second portion 32 (see FIG. 4). The second ridgelines 321 also extend in the direction inclined with respect to the vehicle front-rear direction.

The second portion 32 also has beads 313 and notches 314. Both the beads 313 and the notches 314 promote compressive deformation of the second portion 32. The beads 313 are formed in each of the upper plate section 38 and the lower plate section 39. The beads 313 are located at two spaced positions in a tip portion of the upper plate section 38. The beads 313 of the lower plate section 39 are also located at the same positions as the beads 313 of the upper plate section 38 (see FIG. 6). The notches 314 are formed on the ridgelines 320 of each of the upper plate section 38 and the lower plate section 39. In the upper plate section 38 and the lower plate section 39, a plurality of the notches 314 is formed at spaced intervals in the vehicle front-rear direction.

Figure 6:
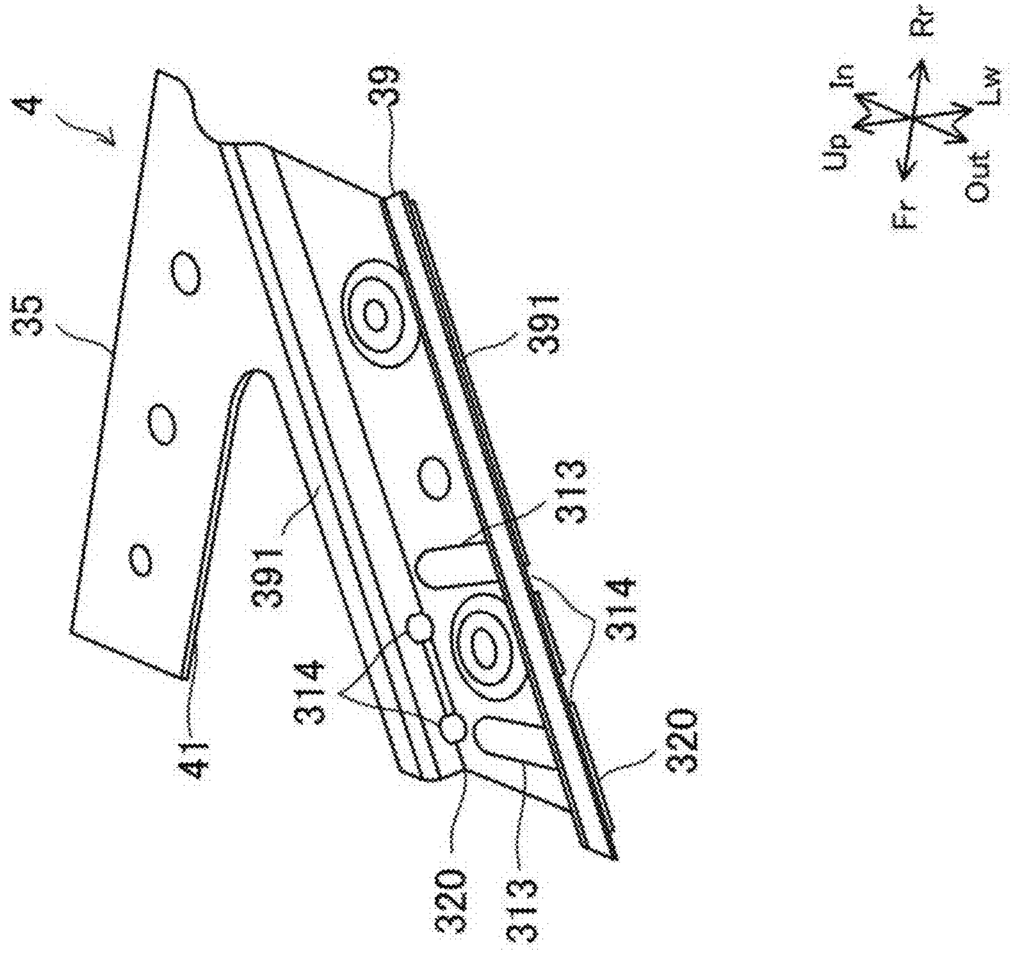
FIG. 6 is a perspective view of a common member in the impact absorbing member.

The impact absorbing member 3 has a common member 4. FIG. 6 is a perspective view of the common member 4. The common member 4 as a whole has a substantially trapezoidal shape in plan view. An inner portion in the vehicle width direction of the common member 4 forms the intermediate plate section 35 of the first portion 31. This portion has a flat plate shape. An outer portion in the vehicle width direction of the common member 4 forms the lower plate section 39 of the second portion 32. This portion has a groove shape that is recessed downward. The common member 4 is provided across the first portion 31 and the second portion 32 and forms a part of each of the first portion 31 and the second portion 32.

As illustrated in the bottom section of FIG. 4, a plate thickness t1 of the common member 4 is greater than a plate thickness t2 of the upper plate section 33, is greater than a plate thickness t3 of the lower plate section 34 of the first portion 31 and is greater than a plate thickness t4 of the upper plate section 38 of the second portion 32.

The common member 4 has an open or removed section 41. As illustrated in the top view of FIG. 4, the removed section 41 is located between the intermediate plate section 35 of the first portion 31 and the lower plate section 39 of the second portion 32 (in the vehicle width direction). The removed section 41 has a substantially triangular shape in plan view. The removed section 41 reduces weight of the impact absorbing member 3 without compromising the function of the impact absorbing member 3.

As illustrated in FIG. 4, a width W1 of the first portion 31 in the vehicle width direction is less than a width W2 of the second portion 32 in the vehicle width direction. The second portion 32 has higher bending rigidity in the vehicle width direction. In addition, a cross-sectional area of the first portion 31 is less than a cross-sectional area of the second portion 32. The second portion 32 having the larger cross-sectional area has the relatively high bending rigidity in the vehicle width direction.

Figure 7:
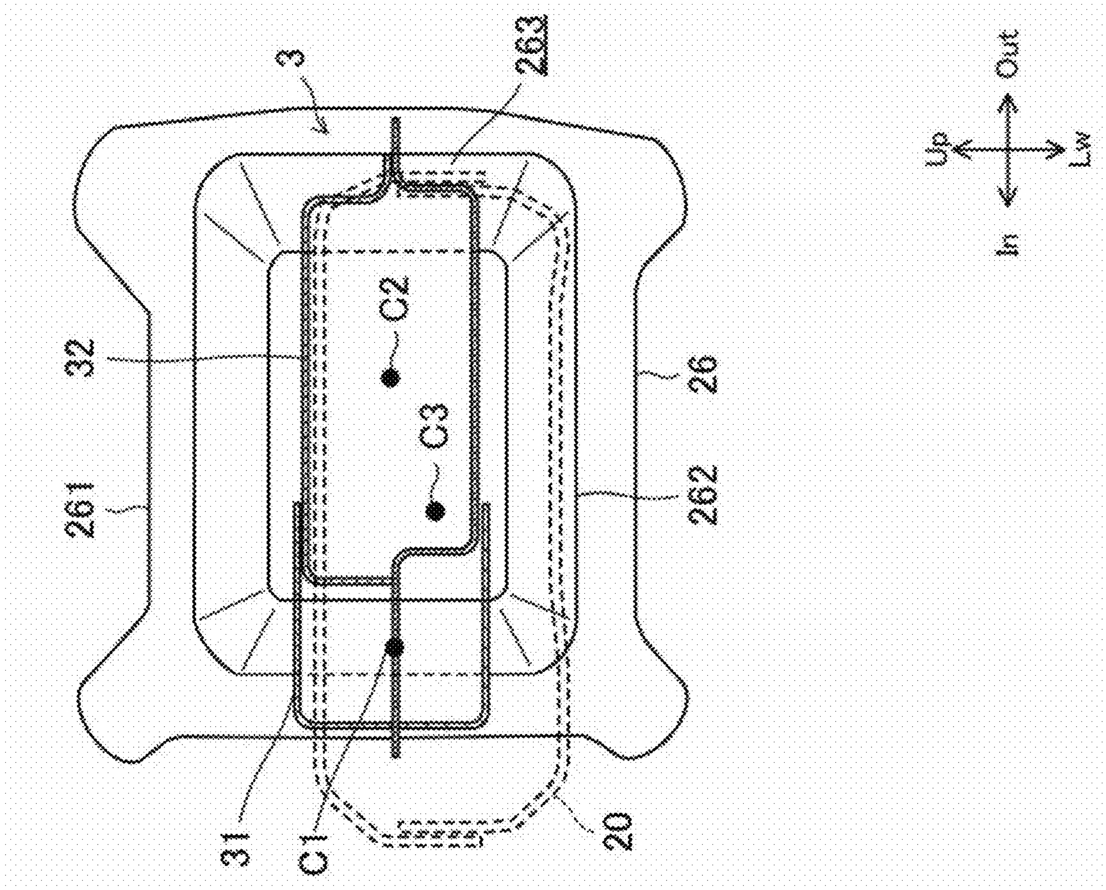
FIG. 7 is a cross-sectional explanatory view illustrating a positional relationship among a rear end of a first portion, a rear end of a second portion, and a front end of a side frame.

FIG. 7 illustrates a positional relationship among a rear end of the first portion 31, a rear end of the second portion 32, and the front end of the side frame 20 in a vehicle front view. As described above, the first portion 31 and the second portion 32 are located at the same height positions in the up-down direction. The rear end of the second portion 32 is located on the outer side of the rear end of the first portion 31 in the vehicle width direction.

In addition, the rear end of the first portion 31 and the rear end of the second portion 32 overlap the front end of the side frame 20 in the vehicle front view. The overlap of the rear end of the first portion 31 means that an imaginary surface surrounded by an outer peripheral edge of the rear end of the hollow first portion 31 partially overlaps an imaginary surface surrounded by an outer peripheral edge of the front end of the side frame 20, which is also hollow, in the vehicle front-rear direction. Similarly, the overlap of the rear end of the second portion 32 means that an imaginary surface surrounded by an outer peripheral edge of the rear end of the hollow second portion 32 partially overlaps the imaginary surface surrounded by the outer peripheral edge of the front end of the side frame 20 in the vehicle front-rear direction.

In the vehicle front view, an end surface center C1 of the rear end of the first portion 31 is located in an end surface of the front end of the side frame 20. In the vehicle front view, an end surface center C2 of the rear end of the second portion 32 is located in the end surface of the front end of the side frame 20. In the vehicle front view, an end surface center C3 of the front end of the side frame 20 is located in the end surface of the rear end of the second portion 32.

Both an upper end of the first portion 31 and an upper end of the second portion 32 are located slightly above an upper end of the side frame 20. The first portion 31, the second portion 32, and the side frame 20 each have the closed cross-sectional structure including vertical walls and horizontal walls. The vertical wall of the first portion 31 and the vertical wall of the second portion 32 overlap the horizontal wall of the side frame 20 in the vehicle front view.

In an implementation, the upper end of the first portion 31 or the upper end of the second portion 32 may each be located at the same position as the upper end of the side frame 20. The upper end of the first portion 31 or the upper end of the second portion 32 may be located slightly below the upper end of the side frame 20. In addition, a lower end of the first portion 31 or a lower end of the second portion 32 may be located slightly above a lower end of the side frame 20, at the same position as the lower end of the side frame 20, or slightly below the lower end of the side frame 20.

Here, as illustrated in FIG. 3, in plan view, both of the two ridgelines 320 of the second portion 32 continue (e.g., extend continuously) from the bumper beam 25 to the set plate 26. While an inner portion in the vehicle width direction of the rear end of the first portion 31 is joined to the set plate 26, an outer portion in the vehicle width direction of the rear end of the first portion 31 does not reach the set plate 26. The outer portion in the vehicle width direction of the rear end of the first portion 31 abuts a side surface of the second portion 32. In plan view, of the two ridgelines 310 of the first portion 31, the inner ridgeline 310 in the vehicle width direction continues from the bumper beam 25 to the set plate 26. The outer ridgeline 310 in the vehicle width direction of the first portion 31 abuts a side portion of the second portion 32.

(Characteristic Structure for Simultaneously Improving Collision Performance and Weight Reduction of Impact Absorbing Member)

The vehicle impact absorbing structure 1 includes the impact absorbing members 3. The impact absorbing members 3 are each located between the side frame 20 and the bumper beam 25 and are compressively deformable or deformed by the impact load that is input to the bumper beam 25 from the front of the vehicle. The impact absorbing members 3 each exert an energy absorption function through compressive deformation and transmit the impact load to the side frame 20.

Figure 8:
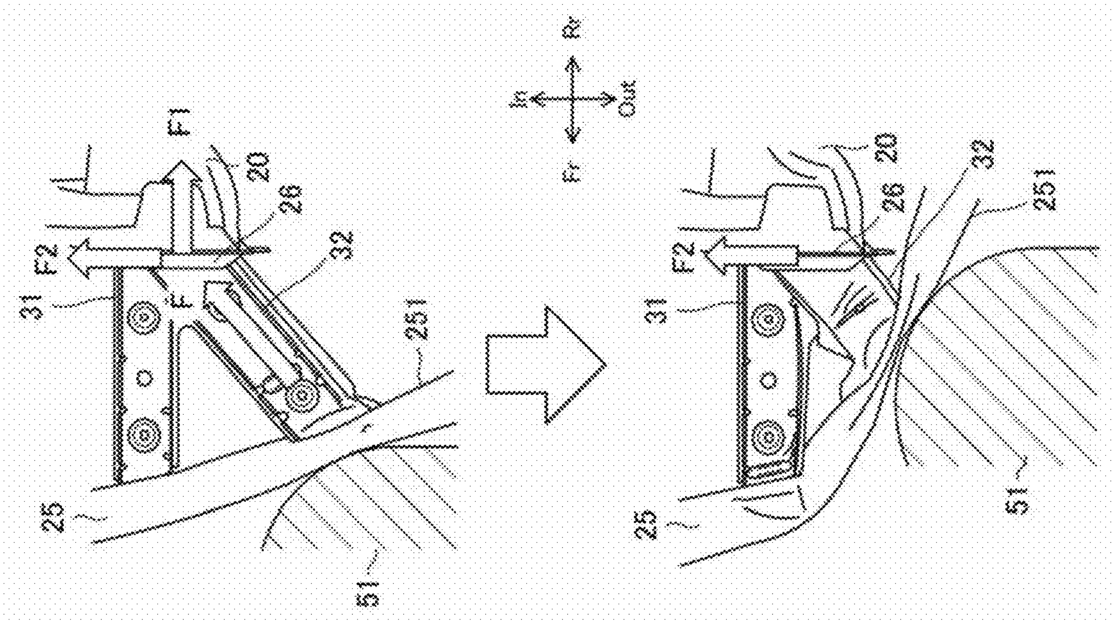
FIG. 8 is a view exemplifying behavior of the impact absorbing member during a small overlap collision.

The impact absorbing member 3 has the first portion 31 and the second portion 32. The second portion 32 is a portion that primarily functions during the small overlap collision. FIG. 8 is a view exemplifying behavior of the impact absorbing member 3 during the small overlap collision.

During the small overlap collision, a colliding object 51 collides with the beam end portion 251. The second portion 32 extends from the front end of the side frame 20 toward the front of the vehicle while being inclined outward in the vehicle width direction, and is joined to the beam end portion 251 of the bumper beam 25. The second portion 32 transmits the impact load to the side frame 20 while being compressively deformed by the impact load input to the beam end portion 251. The second portion 32 has the energy absorption function. Since the first portion 31 does not come into contact with the colliding object 51 during the small overlap collision, the first portion 31 hardly contributes to energy absorption.

Since the second portion 32 is inclined with respect to the vehicle front-rear direction, an impact load F that is input to the front end of the side frame 20 through the second portion 32 is broken down into a load F1 in the vehicle front-rear direction and a load F2 that is directed inward in the vehicle width direction. The load F2 that is directed inward in the vehicle width direction is a reaction force that is directed inward in the vehicle width direction, and causes the vehicle to move inward in the vehicle width direction. Since the vehicle moves in a direction away from the colliding object 51, the colliding object 51 is suppressed from coming into contact with the cabin 11 behind the side frame 20.

During the small overlap collision, the impact absorbing member 3 exerts or performs the following functions by the second portion 32; (1) the energy absorption function, (2) the function to transmit the impact load to the side frame 20, and (3) a function to generate the reaction force directed inward in the vehicle width direction. The vehicle impact absorbing structure 1 enhances collision performance during the small overlap collision. In addition, the second portion 32 itself has the energy absorption function. Since the second portion 32 is not a portion that merely contacts the first portion 31 as in the related art, a reinforcement structure that assumes the contact with the second portion 32 can be omitted in the impact absorbing member 3. Therefore, the vehicle weight is reduced.

Figure 9:
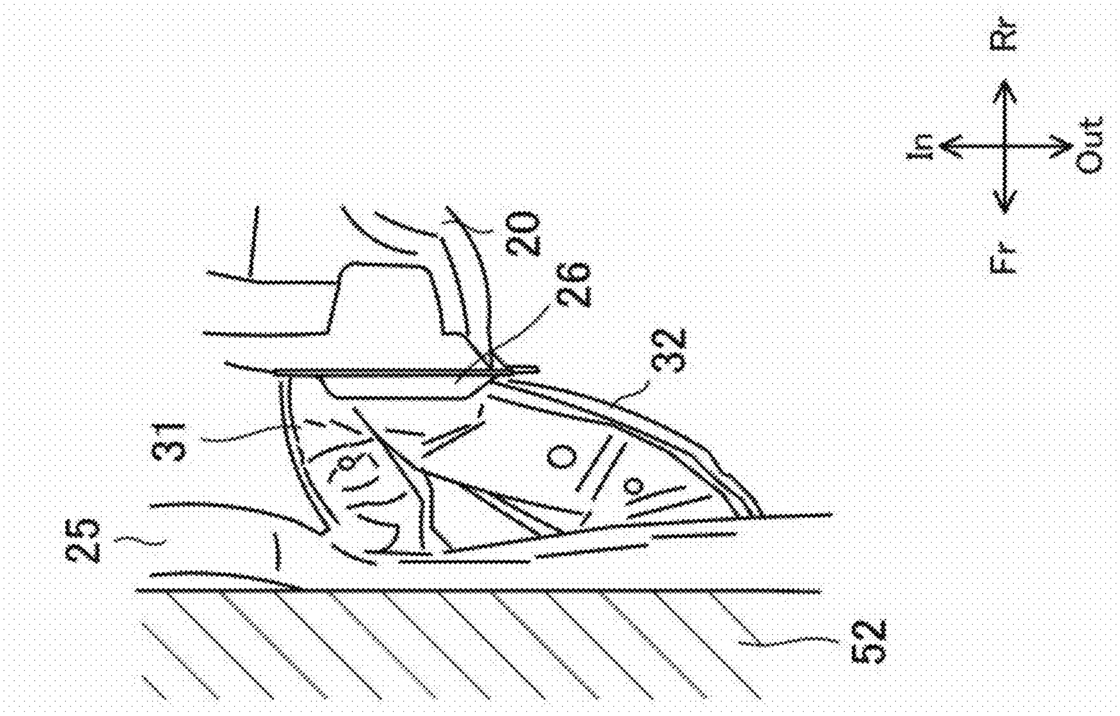
FIG. 9 is a view exemplifying the behavior of the impact absorbing member during a full-frontal collision.

The first portion 31 comes into contact with the colliding object during the full-frontal collision or the offset collision. The first portion 31 is a portion that functions during the full-frontal collision or the offset collision. FIG. 9 is a view exemplifying the behavior of the impact absorbing member 3 during the full-frontal collision.

The first portion 31 extends from the front end of the side frame 20 toward the front of the vehicle in the vehicle front-rear direction. The first portion 31 is compressively deformed by an impact load in the vehicle front-rear direction, which is input by a colliding object 52. In the vehicle front view, the rear end of the first portion 31 overlaps the front end of the side frame 20. During the full-frontal collision or the offset collision, the impact load is efficiently input to the side frame 20 via the first portion 31. The first portion 31 absorbs the energy and transmits the impact load to the side frame 20.

During the full-frontal collision, the second portion 32 is also compressively deformed by the impact load in the vehicle front-rear direction, which is input by the colliding object 52. The second portion 32, together with the first portion 31, absorbs the energy and assists in transmitting the impact load to the side frame 20.

As illustrated in FIG. 3 and FIG. 7, the rear end of the second portion 32 is located on the outer side of the rear end of the first portion 31 in the vehicle width direction, and the rear end of the second portion 32 overlaps the front end of the side frame 20 in the vehicle front view. During the small overlap collision, the second portion 32 can efficiently transmit the impact load, which is input to the beam end portion 251, to the front end of the side frame 20. During the small overlap collision, the second portion 32 can stably perform the three functions (1), (2), and (3).

The rear end of the impact absorbing member 3 is joined to the set plate 26. In detail, as illustrated in FIG. 3, FIG. 5, and FIG. 7, the rear end of the impact absorbing member 3 is joined to the convex section 262 of the set plate 26.

The set plate 26 having the convex section 262 has high rigidity. The impact absorbing member 3 can efficiently transmit the impact load to the side frame 20 via the set plate 26.

The second portion 32 is inclined with respect to the vehicle front-rear direction. When a portion, to which the rear end of the second portion 32 is joined, on the outer side in the vehicle width direction is the body section 261 of the set plate 26, as illustrated in FIG. 3, an angle defined by the rear end of the second portion 32 and the body section 261 as the joint portion is an acute angle in plan view. However, the rear end of the second portion 32 is joined to the inclined surface 263 of the convex section 262. The inclined surface 263 makes a joint angle θ between the rear end of the second portion 32 and the joint portion a right angle or substantially the right angle. With the large joint angle θ, a space is secured for welding work during assembly of the vehicle impact absorbing structure 1. The inclined surface 263 allows the rear end of the second portion 32 to be joined to the set plate 26 by line welding.

As illustrated in FIG. 7, in the vehicle front view, the end surface center C1 of the rear end of the first portion 31 and the end surface center C2 of the rear end of the second portion 32 are located in the end surface of the front end of the side frame 20. An area where a rear end surface of the first portion 31 and a rear end surface of the second portion 32 overlap a front end surface of the side frame 20 is relatively large. Each of the first portion 31 and the second portion 32 can efficiently transmit the impact load to the front end of the side frame 20.

In the vehicle front view, the end surface center C3 of the front end of the side frame 20 is located in the end surface of the rear end of the second portion 32. An area where the rear end surface of the second portion 32 overlaps the front end surface of the side frame 20 is relatively large. The second portion 32 can efficiently transmit the impact load during the small overlap collision to the front end of the side frame 20.

As illustrated in FIG. 7, the vertical wall of the first portion 31 and the vertical wall of the second portion 32 overlap the horizontal wall of the side frame 20 in the vehicle front view. Each of the first portion 31 and the second portion 32 can directly transmit the impact load to the side frame 20. The stable transmission of the impact load improves the collision performance of the vehicle impact absorbing structure 1.

As illustrated in FIG. 3, the ridgelines 320 of the second portion 32 extend continuously from the bumper beam 25 to the front end of the side frame 20. During the small overlap collision, the second portion 32 can further efficiently transmit the impact load, which is input to the beam end portion 251, to the front end of the side frame 20.

A part of the rear end of the first portion 31 abuts the side portion of the second portion 32, and a remaining part of the rear end of the first portion 31 is joined to the set plate 26. In other words, of two mutually-interfering portions, which are the first portion 31 and the second portion 32, in a rear end portion of the impact absorbing member 3, the second portion 32 is prioritized, and the ridgelines 320 are made to continue to the set plate 26.

In a state of being in close proximity to each other in the vehicle width direction, the rear end of the first portion 31 and the rear end of the second portion 32 are joined to the set plate 26. Each of the first portion 31 and the second portion 32 can efficiently transmit the impact load to the front end of the side frame 20.

(Characteristic Structure for Increasing Bending Rigidity of Second Portion)

As illustrated in FIG. 4, the width W1 of the first portion 31 in the vehicle width direction is less than the width W2 of the second portion 32in the vehicle width direction. The second portion 32 has the higher bending rigidity in the vehicle width direction than the first portion 31.

The second portion 32 is inclined with respect to the vehicle front-rear direction. When the impact load is input to the beam end portion 251 due to the small overlap collision, the inclined second portion 32 could possibly bent outward in the vehicle width direction. However, the impact absorbing member 3 is a member in which the bending rigidity of the second portion 32, which is the bending rigidity against the load in the vehicle width direction, is higher than the bending rigidity of the first portion 31, which is the bending rigidity against the load in the vehicle width direction. When the impact load of the small overlap collision is input to the beam end portion 251, the high bending rigidity helps prevent the second portion 32 from being bent outward in the vehicle width direction. As illustrated in FIG. 8, the second portion 32 is not bent but compressively deformed. The second portion 32 can efficiently transmit the impact load to the side frame 20 while absorbing the energy through compressive deformation. During the small overlap collision, the impact absorbing member 3 can stably exert the three functions described above.

The cross-sectional area of the second portion 32 is larger than the cross-sectional area of the first portion 31. The large cross-sectional area is advantageous in improving the bending rigidity of the second portion 32.

The first portion 31 is the closed cross-sectional structure that has the first closed cross section 311 and the second closed cross section 312 aligned in the up-down direction. The first portion 31 having the closed cross-sectional structure efficiently transmits the impact load to the side frame 20 while being compressively deformed by the impact load. In addition, since the first portion 31 has the two closed cross sections that are the first closed cross section 311 and the second closed cross section 312, energy absorption capacity thereof during the compressive deformation is high. The first portion 31 can further ensure the desired bending rigidity despite the small cross-sectional area.

The second portion 32 is the closed cross-sectional structure in which the upper plate section 38 and the lower plate section 39 are stacked and joined to each other in the up-down direction, and the upper plate section 38 and the lower plate section 39 have the joint flanges 381, 391, respectively. The second portion 32 having the closed cross-sectional structure is advantageous in improving the bending rigidity. In addition, the second portion 32 having the joint flanges 381, 391 has the second ridgelines 321, each of which is the corner formed by bending and extends from one end to the other end of the second portion 32. The bending rigidity of the second portion 32 is further increased, and during the input of the impact load, the second portion 32 stably realizes both the absorption of the energy through the compressive deformation and the transmission of the impact load to the side frame 20.

(Characteristic Structure for Suppressing Collapse of Second Portion)

The second portion 32 is inclined with respect to the vehicle front-rear direction. When the impact load is input to the beam end portion 251 due to the small overlap collision, the inclined second portion 32 possibly collapses outward in the vehicle width direction.

The impact absorbing member 3 has the common member 4. The common member 4 is provided across the first portion 31 and the second portion 32 and forms a part of each of the first portion 31 and the second portion 32. When the impact load of the small overlap collision is input to the beam end portion 251, the common member 4 suppresses the second portion 32 from collapsing outward in the vehicle width direction by the rigidity of the common member 4. As illustrated in FIG. 8, the second portion 32 does not collapse. The second portion 32, the collapse of which is suppressed, can efficiently transmit the impact load to the side frame 20 while absorbing the energy through the compressive deformation. During the small overlap collision, the impact absorbing member 3 can stably exert the three functions described above.

The common member 4 includes the intermediate plate section 35, which is located between the first closed cross section 311 and the second closed cross section 312 in the first portion 31, and the lower plate section 39, which is located at the bottom of the closed cross section in the second portion 32. The first portion 31 and the second portion 32 that are formed by including the common member 4 efficiently transmit the impact load to the side frame 20 while being compressively deformed by the impact load. The impact absorbing member 3 exerts the improved collision performance while being lightweight.

With the common member 4 as the intermediate plate section 35, the first portion 31 has the two closed cross sections that are the first closed cross section 311 and the second closed cross section 312. The first portion 31 can ensure the high energy absorption function despite being lightweight.

In the first portion 31, the plate thickness t1 of the intermediate plate section 35 is greater than the plate thickness t2 of the upper plate section 33 and greater than the plate thickness t3 of the lower plate section 34. Since the plate thickness t1 of the intermediate plate section 35 is relatively great, the first portion 31 can ensure the high energy absorption function associated with the compressive deformation.

In addition, since the common member 4 having the great plate thickness t1 is highly rigid, the common member 4 can effectively suppress the second portion 32 from collapsing outward in the vehicle width direction during the small overlap collision.

The common member 4 has the removed section 41 between the first portion 31 and the second portion 32. The removed section 41 reduces the weight of the impact absorbing member 3 without compromising the function of the common member 4.

As it has been described so far, the vehicle impact absorbing structure 1 can improve the collision performance during the small overlap collision without increasing the vehicle weight.

MODIFIED EMBODIMENTS

Figure 10:
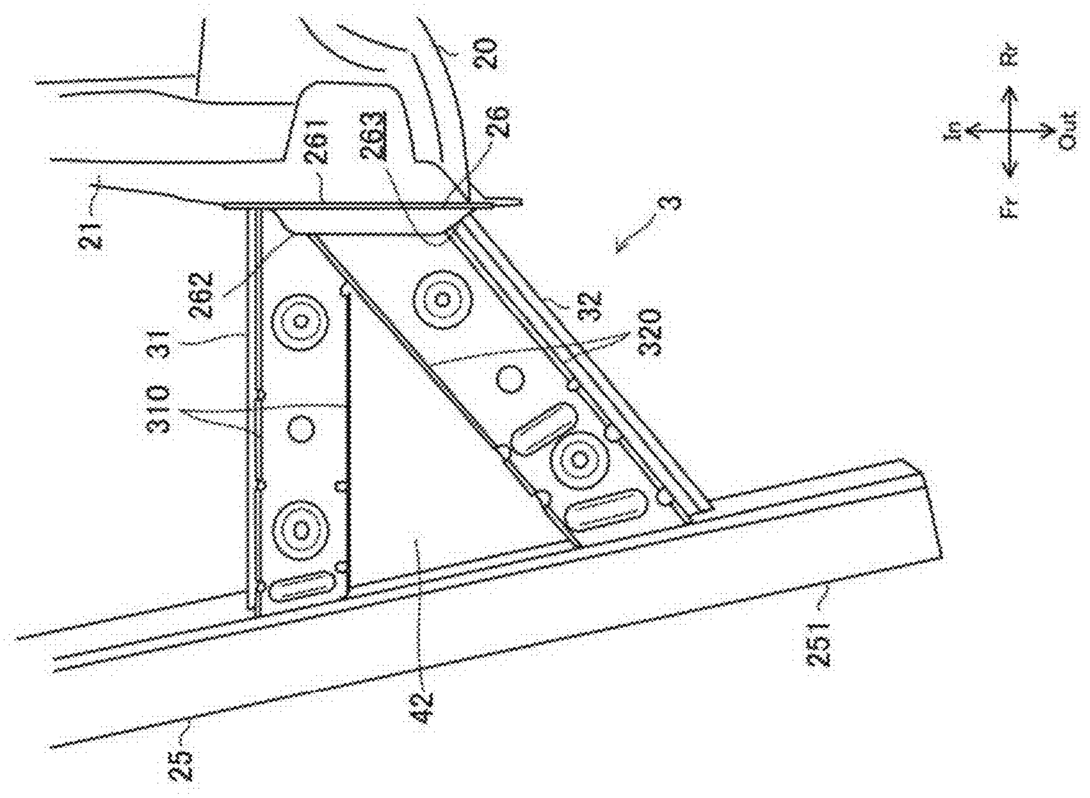
FIG. 10 is a plan view of an impact absorbing member according to a modified embodiment.
Figure 11:
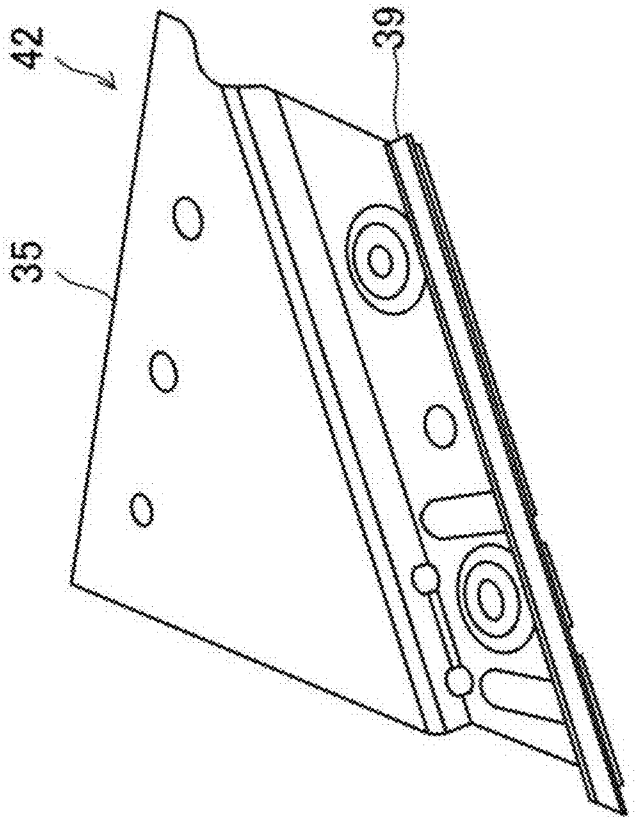
FIG. 11 is a perspective view of a common member in the impact absorbing member according to the modified embodiment.

FIG. 10 illustrates a modified embodiment of the vehicle impact absorbing structure 1. FIG. 10 illustrates a modified embodiment of the common member. FIG. 11 illustrates a common member 42 according to the modified embodiment. The common member 42 does not have a removed section. Rigidity of the common member 42, which does not have the removed section, is even higher. The common member 42 can further suppress the second portion 32 from collapsing outward in the vehicle width direction. In addition, the common member 42, which does not have the removed section, has the high energy absorption capacity. The impact absorbing member 3 can sufficiently absorb the impact load during various collisions.

Figure 12:
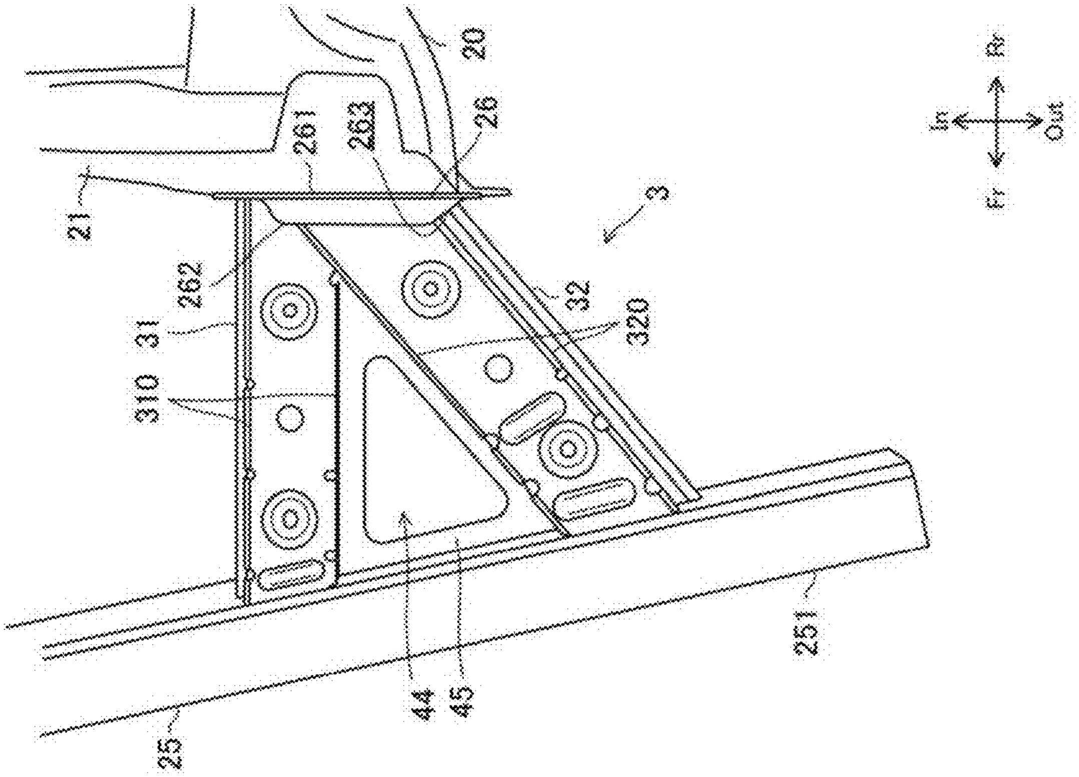
FIG. 12 is a plan view of an impact absorbing member according to further another modified embodiment.
Figure 13:
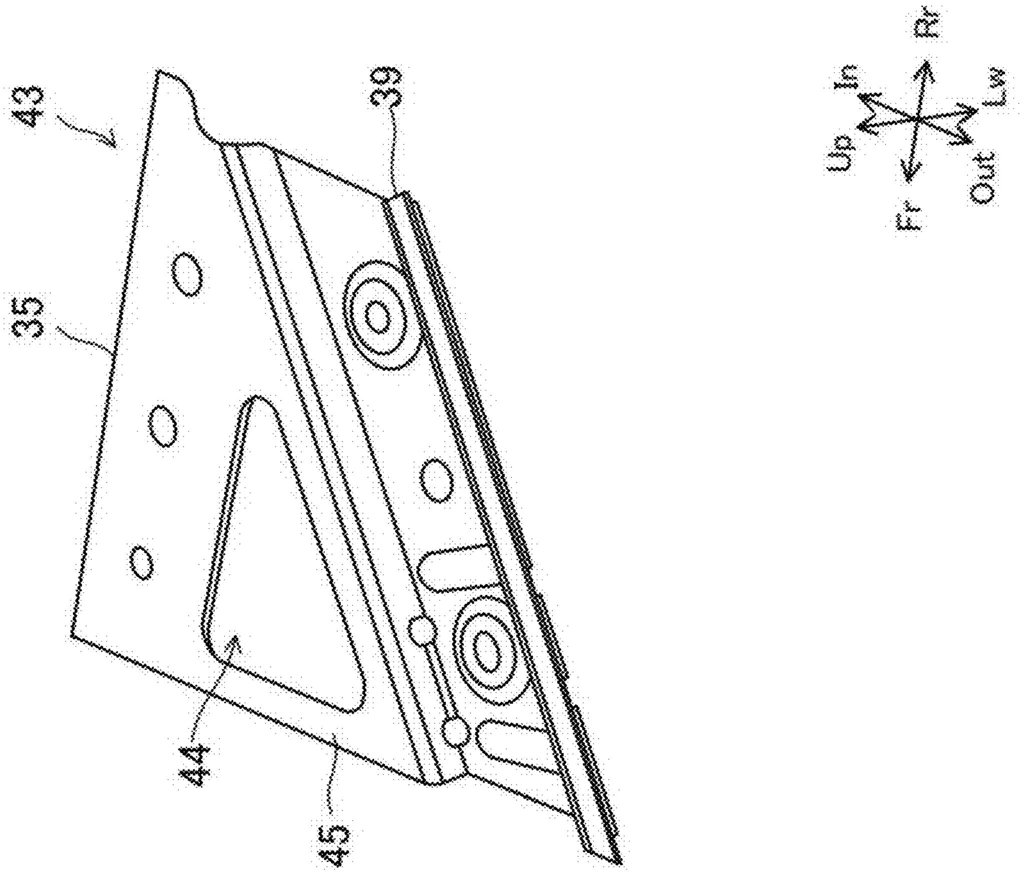
FIG. 13 is a perspective view of a common member in the impact absorbing member according to the further other modified embodiment.

FIG. 12 illustrates further another modified embodiment of the common member. FIG. 13 illustrates a common member 43 according to the modified embodiment. The common member 43 has a removed section 44 in a different shape from that in FIG. 6. The common member 43 has a coupling section 45 in a front end portion. The coupling section 45 couples the intermediate plate section 35 of the first portion 31 and the lower plate section 39 of the second portion 32 in the vehicle width direction. Since the coupling section 45 supports the front end portion of the second portion 32, the common member 43 is highly effective in suppressing the second portion 32 from collapsing outward in the vehicle width direction despite being lightweight.

The vehicle impact absorbing structure disclosed herein is not limited to application to the side frame but can also be applied to the front frame. In other words, the impact absorbing member 3 may be attached to a tip or end of the front frame.

REFERENCE SIGNS LIST

1: impact absorbing structure
20: side frame
25: bumper beam
26: set plate

251: beam end portion
262: convex section
3: impact absorbing member
31: first portion
32: second portion
33: upper plate section
34: lower plate section
35: intermediate plate section
38: upper plate section
39: lower plate section
310: ridgeline
311: first closed cross section
312: second closed cross section
320: ridgeline
381: joint flange
391: joint flange
4: common member
41: removed section
42: common member
43: common member
44: removed section
C1: end surface center of first portion
C2: end surface center of second portion
C3: end surface center of side frame
t1: plate thickness of common member
t2: plate thickness of upper plate section of first portion
t3: plate thickness of lower plate section of first portion
t4: plate thickness of upper plate section of second portion

The invention claimed is:

1. A vehicle impact absorbing structure, comprising:

a side frame that extends in a vehicle front-rear direction in a vehicle front portion;

a bumper beam that extends in a vehicle width direction in front of the side frame, the bumper beam having a beam end portion located on an outer side of the side frame in the vehicle width direction; and an impact absorbing member that couples a front end of the side frame and the bumper beam in the vehicle front-rear direction, the impact absorbing member being compressively deformable by an impact load that is input to the bumper beam from the front of the vehicle, wherein:

the impact absorbing member has:

a first portion that extends from the front end of the side frame toward the front of the vehicle in the vehicle front-rear direction, the first portion being joined to the bumper beam;

a second portion that extends from the front end of the side frame toward the front of the vehicle and inclined outwardly in the vehicle width direction, the second portion being joined to the beam end portion of the bumper beam; and a common member that is provided across the first portion and the second portion, the common member forming a part of each of the first portion and the second portion, and a bending rigidity of the second portion against a load in the vehicle width direction is higher than a bending rigidity of the first portion against the load in the vehicle width direction.

2. The vehicle impact absorbing structure according to claim 1, wherein a cross-sectional area of the second portion is larger than a cross-sectional area of the first portion.

3. The vehicle impact absorbing structure according to claim 1, wherein a width of the second portion in the vehicle width direction is greater than a width of the first portion in the vehicle width direction.

4. The vehicle impact absorbing structure according to claim 1, wherein the first portion is a closed cross-sectional structure that has a first closed cross section and a second closed cross section aligned in an up-down direction.

5. The vehicle impact absorbing structure according to claim 2, wherein the first portion is a closed cross-sectional structure that has a first closed cross section and a second closed cross section aligned in an up-down direction.

6. The vehicle impact absorbing structure according to claim 3, wherein the first portion is a closed cross-sectional structure that has a first closed cross section and a second closed cross section aligned in an up-down direction.

7. The vehicle impact absorbing structure according to claim 4, wherein:

the second portion is a closed cross-sectional structure in which an upper plate section and a lower plate section are stacked and joined in the up-down direction, and at least one of the upper plate section and the lower plate section has a joint flange.

8. The vehicle impact absorbing structure according to claim 5, wherein:

the second portion is a closed cross-sectional structure in which an upper plate section and a lower plate section are stacked and joined in the up-down direction, and at least one of the upper plate section and the lower plate section has a joint flange.

9. The vehicle impact absorbing structure according to claim 6, wherein:

the second portion is a closed cross-sectional structure in which an upper plate section and a lower plate section are stacked and joined in the up-down direction, and at least one of the upper plate section and the lower plate section has a joint flange.

10. The vehicle impact absorbing structure according to claim 1, wherein each of the first portion and the second portion is a closed cross-sectional structure including a corner, a ridgeline of the corner of the second portion extends continuously from the bumper beam to the front end of the side frame, and a part of the rear end of the first portion abuts a side portion of the second portion.

11. The vehicle impact absorbing structure according to claim 10, wherein the ridgelines extend in a direction that is inclined with respect to the vehicle front-rear direction.

12. The vehicle impact absorbing structure according to claim 1, wherein at least a part of the rear end of the second portion is located on an outer side of the rear end of the first portion in the vehicle width direction.

13. A vehicle impact absorbing structure, comprising:

a side frame that extends in a vehicle front-rear direction in a vehicle front portion;

a set plate attached to a front end of the side frame;

a bumper beam that extends in a vehicle width direction in front of the side frame, the bumper beam having a beam end portion located on an outer side of the side frame in the vehicle width direction; and an impact absorbing member that couples a front end of the side frame and the bumper beam in the vehicle front-rear direction, the impact absorbing member being compressively deformable by an impact load that is input to the bumper beam from the front of the vehicle, wherein:

the impact absorbing member has:

a first portion that extends from the front end of the side frame toward the front of the vehicle in the vehicle front-rear direction, the first portion being joined to the bumper beam; and a second portion that extends from the front end of the side frame toward the front of the vehicle and inclined outwardly in the vehicle width direction, the second portion being joined to the beam end portion of the bumper beam, a bending rigidity of the second portion against a load in the vehicle width direction is higher than a bending rigidity of the first portion against the load in the vehicle width direction, a part of a rear end of the first portion abuts a side portion of the second portion, and a remaining part of the rear end of the first portion and a rear end of the second portion are joined to the set plate.

* * * * *